F. S. WENDT 3,044,043

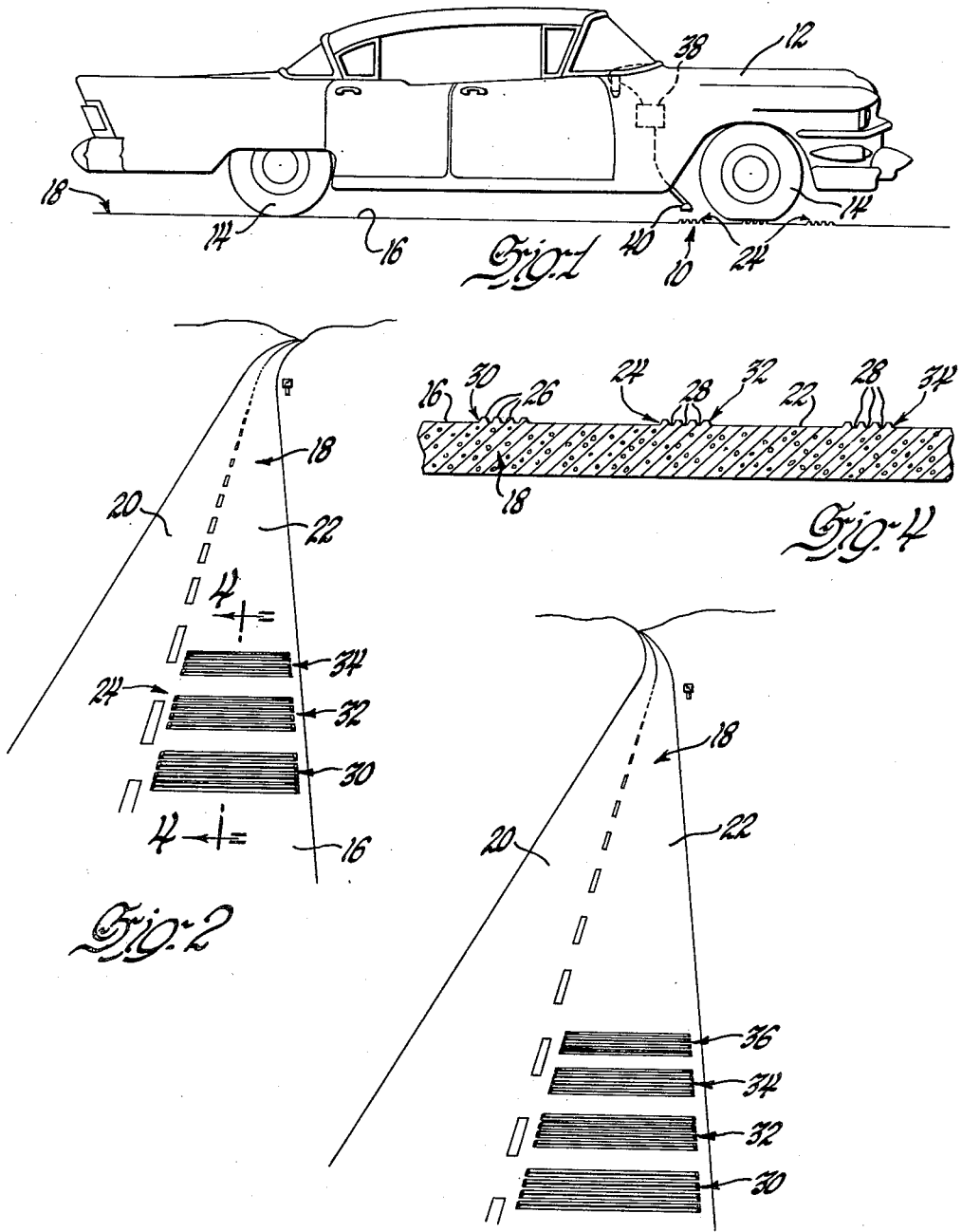
July 10, 1962
F. S. WENDT
3,044,043
VEHICLE SIGNALLING APPARATUS FOR WARNING OF APPROACHING ROAD CONDITIONS
Filed July 21, 1958
3 Sheets-Sheet 1
INVENTOR.
Frank S. Wendt
BY
D. R. Sadler
ATTORNEY July 10, 1962

VEHICLE SIGNALLING APPARATUS FOR WARNING OF
APPROACHING ROAD CONDITIONS

Filed July 21, 1958

INVENTOR.
Frank S. Wendt
BY
D. R. Sadler
ATTORNEY

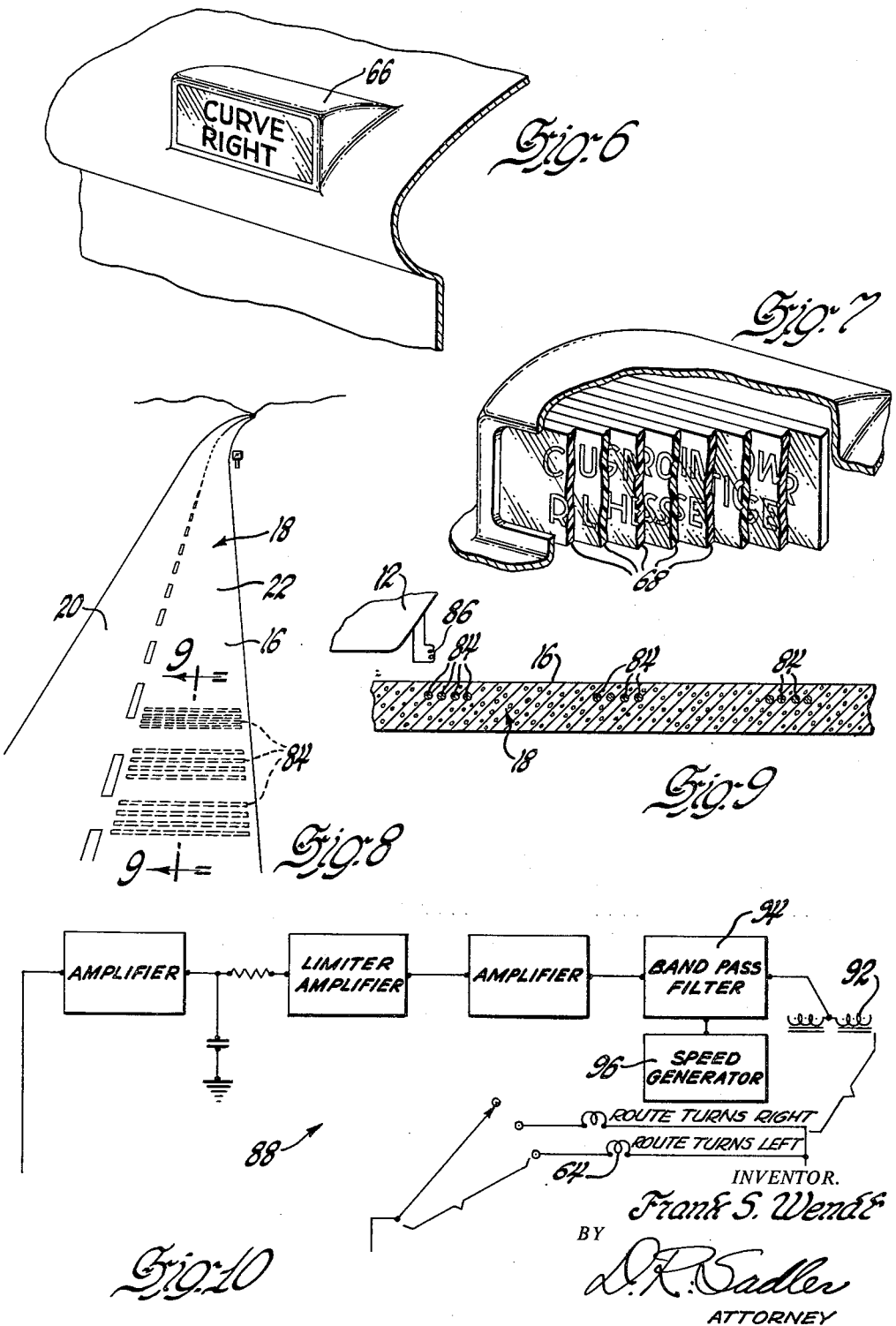

United States Patent Office 3,044,043
Patented July 10, 1962

3,044,043
VEHICLE SIGNALLING APPARATUS FOR WARNING OF APPROACHING ROAD CONDITIONS
Frank S. Wendt, Birmingham, Mich., assignor to General Motors Corporation, Detroit, Mich., a corporation of Delaware
Filed July 21, 1958, Ser. No. 749,983
9 Claims. (Cl. 340—32)

The present invention relates to automotive vehicles and, more particularly, to means for automatically signalling such a vehicle of approaching road conditions.

In order to assist the operator or driver of an automotive vehicle in following a roadway or a particular route, it is customary to provide signs adjacent to the roadway that warn of approaching road conditions and/or changes in the route the driver is following. However, at the present time the driver or operator of such a vehicle must devote the major portion of his attention to the operation of the vehicle and has little, if any, opportunity to observe the surrounding area. As a result of this preoccupation of the driver, these warning signs frequently go unnoticed by the driver and/or due to the limited time available, the driver is unable to read the entire sign. It is therefore apparent that at the present time the drivers of high speed automotive vehicles frequently do not receive adequate warning or information as to approaching road conditions.

It is now proposed to provide an indicating mechanism which will insure the operator being positively advised of all pertinent information as to approaching road conditions, routing, etc. without any conscious effort on his part. More particularly, this is to be accomplished by providing suitable signal sources on the surface of the road or buried therebeneath and a pickup on the vehicle which will sense the presence of the signal sources as the vehicle passes thereover and will produce a suitable indication in the vehicle. The signal sources are arranged in groups or are spaced from each other so as to be coded in response to the type of road condition the vehicle is approaching. The indicating mechanism may be responsive to the coding of the signal sources so that the indication in the vehicle will be indicative of the particular condition being approached. This indication may be made sufficiently conspicuous by audible or visual means to insure the operator being aware thereof. In addition, the indication may be made to persist for a sufficient period of time to enable the operator to clearly comprehend the significance of the warning.

In the drawings:

FIGURE 1 is a side elevational view of an automotive vehicle employing an indicating mechanism embodying the present invention.

FIGURE 2 is a perspective view of a roadway embodying a warning of an approaching road condition.

FIGURE 3 is a perspective view of a roadway embodying a warning of another approaching road condition.

FIGURE 4 is a cross-sectional view taken substantially along the plane of line 4—4 in FIGURE 2.

FIGURE 6 is a perspective view of an indicator suitable for use in the present invention.

FIGURE 7 is a perspective view similar to FIGURE 6, but with portions thereof being broken away.

FIGURE 8 is a perspective view of a roadway employing another embodiment of the present invention.

FIGURE 9 is a cross-sectional view taken substantially along the plane of line 9—9 in FIGURE 8.

FIGURE 10 is a schematic diagram of a portion of the indicating mechanism employed with the embodiment illustrated in FIGURE 11.

Figure 5:
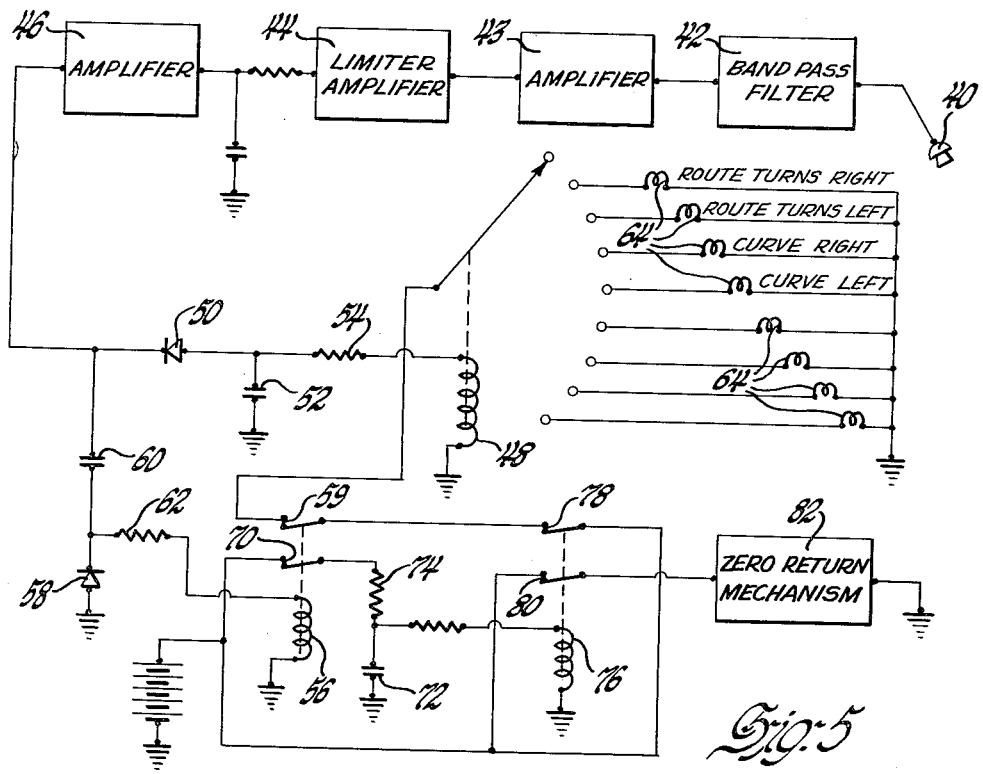
FIGURE 5 is a schematic view of the indicating mechanism carried by the vehicle of FIGURE 1.

Referring to the drawings in more detail, the present invention is embodied in an indicating mechanism 10 for use on an automotive vehicle 12 having a plurality of wheels 14 for rolling along the surface 16 of a roadway 18 having one or more traffic lanes 20 and 22.

The indicating mechanism 10 includes suitable signal sources 24 located in the right hand lane 22 of the roadway 18 for warning the vehicle operator of any approaching road conditions. Although the signal sources 24 may be of any suitable variety, in the present instance they comprise surface irregularities such as a plurality of projections 26 and recesses 28 that extend transversely of the lane 22. These irregularities are preferably of sufficient size to produce a sound as a wheel 14 rolls thereover but are not sufficiently large to produce any material effects on the motion of the vehicle 12.

The signal sources 24 are coded to indicate the type of approaching road condition by the arrangement and disposition thereof. In this embodiment the irregularities are substantially uniformly spaced from each other but are arranged in groups 30, 32, 34 and 36 with the number of groups corresponding to the approaching condition. For example, in FIGURE 2 it will be seen that a vehicle traveling in the right hand lane 22 will be approaching a right curve. Accordingly, the surface 16 of the roadway 18 is provided with three groups 30, 32 and 34 of irregularities with the result that the vehicle 12 will produce three separate audible signals as it passes thereover. Conversely a vehicle traveling in the right lane 22 of FIGURE 3 will be approaching a left curve. Accordingly, the surface 16 of this lane 22 is provided with four groups 30, 32, 34 and 36 of irregularities with the result that the vehicle 12 will produce four separate audible signals as it passes thereover. It is, of course, apparent that any number of groups may be employed to indicate conditions such as approaching an intersection, a hill, a required stop, school zones, restricted speed zones, route turns and/or no passing zones, etc.

Although surface irregularities of the foregoing nature may be adapted to provide a clearly audible warning to the vehicle operator, it is also desirable to provide means 38 which will be responsive to these sounds and will automatically provide a more obvious and persistent warning inside of the vehicle 12. The present means 38 includes a pickup 40 such as a microphone or similar transducer disposed in the immediate vicinity of one of the wheels 14 so as to respond to the noises produced thereby. The pickup 40 is, in turn, interconnected with a suitable band-pass filter 42 that is adapted to pass only those signals corresponding to those produced by the wheel 14 traveling over the corrugations and to suppress all others. The output of the filter 42 is then amplified by amplifier 43 and fed into a limiter 44 which is effective to limit the amplitude of the signal to a constant amount. This signal is then fed into an amplifier 46 having a sufficient power in the output for actuating a relay.

The output of the power amplifier 46 is coupled to a step relay 48 by a rectifier 50 and RC circuit including a condenser 52 and resistor 54. The time constant of this RC circuit is equal for charging and discharging and is preferably sufficiently long to prevent actuation of the relay 48 as a result of short duration random noises produced by the vehicle 12 passing over imperfections, etc. in the road surface 16. In addition, the amplifier 46 is connected to a second relay 56 by a circuit having a rectifier 58, a condenser 60 and a resistor 62. The charging time constant for this circuit is equal to the time constant of the first RC circuit whereas the discharging time constant is considerably longer than the charging time constant. As a result this relay 56 will open contacts 59 with the first step of the first relay 48. Since the discharging time constant is considerably longer, the contacts 59 will remain open until the first relay 48 has finished stepping. The contacts 59 will then close and cause illumination of the lamp 64 previously selected by the step relay 48.

The illuminating warning device 66 comprises a series of clear sheets of a plastic 68 such as Lucite that are placed one behind another with each sheet being engraved or etched with a suitable legend. By placing the lamps 64 so as to illuminate the edge of an appropriate sheet, only the corresponding legend will be apparent to the driver.

When the contacts 59 close the second set of contacts 70 will close and apply a D.C. voltage to the condenser 72 and resistor 74 in an RC circuit controlling relay 76. When the voltage across the condenser 72 rises sufficiently, the relay 76 will open the contacts 78 and shut off the lamp 64 and also open the contacts 80 to actuate a zero reset mechanism 82 for returning the step relay 48 to the neutral contact. The time constant of this circuit is preferably sufficiently long to insure the operator having more than ample time to observe the indication.

It may thus be seen that a vehicle 12 traveling along the right lane 22 of FIGURE 2 will pass over three groups 30, 32 and 34 of irregularities so that the relay 48 will be advanced three contacts so as to cause an indication of an approaching right curve. Similarly, a vehicle 12 traveling in the right lane 22 of FIGURE 3 will pass over four groups 30, 32, 34 and 36 of irregularities and cause the relay 48 to advance four contacts so as to cause an indication of an approaching left curve.

If desired, the spacing between the irregularities may be varied in accordance with the prescribed speed limit so that a vehicle 12 traveling at the maximum legal limit will always produce the same pitched sound. Thus a frequency responsive device may be actuated whenever the pitch is above this amount to indicate the vehicle is exceeding the speed limit.

As an alternative the embodiment in FIGURE 8 may be employed. This embodiment is very similar to the foregoing arrangement except that the signal sources 84 are buried beneath the surface 16 of the road 18 and the pickup coil 86 carried on the vehicle 12 is adapted to sense the presence of the signal sources 84 as the vehicle passes thereover. The signal sources may be permanently magnetized so as to generate a potential in a passing inductive coil or they may be of a suitable substance for changing the inductance of a pickup coil 86 as it passes thereover. These concealed signal sources 84 may be coded in a manner similar to the first embodiment so as to actuate a suitable indicating mechanism.

Figure 11:
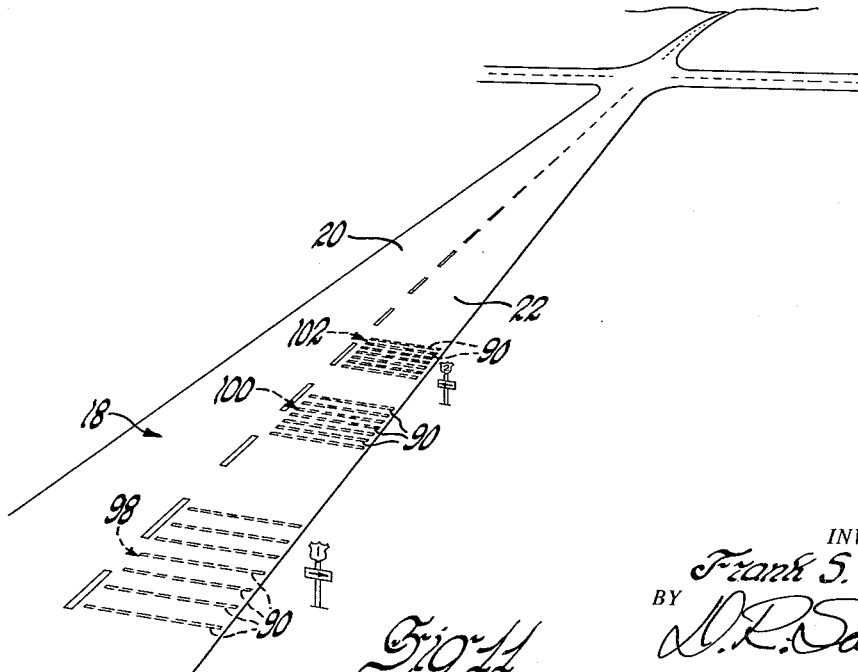
FIGURE 11 is a perspective view of a roadway employing another embodiment of the present invention.

As a further possible alternative the embodiment of FIGURES 10 and 11 may be employed. In this embodiment the information to be furnished the driver is coded into the signal sources 90 by varying the spacing therebetween. Thus as the vehicle 12 passes over these sources 90, the frequency of the signal developed in the pickup 92 carried by the vehicle 12 will be a function of the vehicle speed and the spacing of the sources 90. In order to decode the signal a bandpass filter 94 may be provided which is actuated in response to the speed of the vehicle 12 so as to pass only those frequencies having a predetermined relation to the speed. One form of filter 94 that may be employed is an LC resonant circuit having an inductance consisting of a saturable coil reactor. A D.C. generator 96 driven in response to the speed of the vehicle 12 will progressively increase the core saturation thereby decreasing the inductance. Thus the resonant frequency will correspond to the vehicle speed.

This system 88 is particularly useful where the driver is endeavoring to follow a particular route. In this event each routing will be assigned a particular frequency and the spacing between the signal sources 90 will be set in accordance with this frequency. When the driver desires to follow a particular route, he sets the frequency of the filter 94 to correspond to the frequency of the route he will follow. This may be accomplished in any suitable manner, for example, by varying the output of the generator 96. When adjusted to a particular frequency the system will only respond to the signal sources having a spacing therebetween corresponding to that frequency.

The signal sources 90 may be coded by any suitable means such as by grouping similar to the foregoing systems. Thus, a vehicle traveling in the right lane 22 of FIGURE 11 will pass over the group 98 of widely spaced signal sources 90 and the two groups 100 and 102 of closely spaced signal sources 90. If the system 88 is tuned to route #1 or the widely spaced sources, the step relay 48 will advance one step and indicate the route turns right. If the system 88 is tuned to route #2 or the closely spaced signal sources 90, the two groups will produce two pulses that will advance the step relay 48 two contacts and indicate the route turns left.

Although a limited number of embodiments have been illustrated and described, it will be obvious to a person skilled in the art that the present invention may be modified in numerous respects. For example, the coding of the signal sources may be accomplished by the number of groups, the frequency, the duration, the amplitude or by any other desired coding techniques. In addition, any desired combination of coding techniques may be employed.

What is claimed is:

1. In a device of the class described, the combination of a pickup carried by a vehicle, a roadway having a plurality of spaced groups of signal sources for actuating said pickup to produce a signal therein as said vehicle passes thereover, the spacing between said signal sources within each group being some predetermined interval and the number of groups of signal sources being indicative of an approaching road condition whereby the signal in said pickup will be indicative of said condition, filtering means responsive to the speed of said vehicle for filtering the signal from said pickup to pass only signals have a predetermined relation to the vehicle speed.

2. In a device of the class described, the combination of a pickup carried by a vehicle, a roadway having a plurality of spaced groups of signal sources for actuating said pickup to produce a signal therein as said vehicle passes thereover, the spacing between said signal sources within each group being some predetermined interval and the number of groups of signal sources being indicative of an approaching road condition whereby the frequency of the signal in said pickup will be related to said predetermined interval and to the vehicle speed and the signal will be modulated by a number of pulses corresponding to said groups and indicative of said approaching road condition, filtering means responsive to the speed of said vehicle for filtering the signal from said pickup to pass only signals having a predetermined relation to the vehicle speed, means operatively interconnected with said filtering means and responsive to said number of pulses to provide an indication of said approaching road condition.

3. An indicating system for use on an automotive vehicle which travels over the surface of a roadway, said system comprising the combination of a roadway surface having groups of signal sources incorporated therewith, each of said groups comprising predetermined numbers of signal sources, said predetermined numbers being respective coded representations of particular approaching road conditions, a pickup mounted on said vehicle in proximity to said surface, said pickup being responsive to said signal sources to develop a signal whenever said vehicle passes over said signal sources, and indicating means responsive to the signal from said pickup, the indicating means including a relay operative in steps in response to the signal to indicate corresponding approaching road conditions.

4. In a device of the class described, the combination of a noise responsive transducer carried by a vehicle, a roadway having noise producing means for actuating the transducer so as to produce a pulsating signal therein as the vehicle passes over the noise producing means, the noise producing means being so arranged that the signal in the transducer is coded according to the number of cycles of pulsations produced thereby indicating an approaching road condition, and means operatively responsive to the coded signal for providing an indication of the approaching road condition in response to the coding.

5. In a device of the class described, the combination of a pickup carried by a vehicle, a roadway having a plurality of signal sources for actuating the pickup so as to produce a pulsating signal therein as the vehicle passes thereover, the spacing between the signal sources being so arranged as to cause the pickup to develop a coded signal indicative of an approaching road condition, the coded signal being determined by the number of cycles of pulsations produced as the vehicle passes over the signal sources, filtering means communicating with the pickup so as to pass only the coded signals, indicating means operatively interconnected with the filtering means so as to provide an indication of the approaching road condition, the indicating means including a stepped relay constructed so as to be progressively actuated by the coded signal according to the number of cycles, timing means coacting with the stepped relay to maintain the indication on a selected time interval, and means resetting the stepped relay when the selected time interval has elapsed.

6. In a system for transmitting information to vehicles moving past a given point on a roadway, a plurality of spaced groups of signalling markers positioned along said roadway at said point, said signalling markers in each group being spaced such that a passing vehicle will intercept said signalling markers at a rate within a predetermined high frequency range, the number of groups of said signalling markers being determined by the specific information to be transmitted, vehicle-mounted pickup means responsive to the presence of said signalling markers and adapted to produce an electrical output corresponding thereto only when the interception rate of said signalling markers is within said predetermined high frequency range, a detector coupled to said pickup means to receive said electrical output and adapted to produce an output pulse upon the interception of each group of signalling markers, and selective means connected to said detector to receive said output pulses, said selective means having a plurality of output devices and being adapted to energize one of said output devices depending upon the number of groups of signalling markers intercepted.

7. In a system for transmitting information to vehicles moving past a given point on a roadway, a plurality of spaced groups of signalling markers positioned along said roadway at said point, said signalling markers in each group being spaced such that a passing vehicle will intercept said signalling markers at a rate within a predetermined high frequency range, the number of groups of said signalling markers being determined by the specific information to be transmitted, vehicle-mounted pickup means responsive to the presence of said signalling markers and adapted to produce an electrical output corresponding thereto, filter means having an input connected to said pickup means to receive said electrical output and adapted to produce an output signal only when said electrical output is within said predetermined high frequency range, a first detector coupled to said filter means to receive said output signal and adapted to produce an output pulse upon the interception of each group of signalling markers, selective indicator means connected to said first detector to receive said output pulses, said indicator means having a plurality of indicator devices and being adapted to energize one of said indicator devices depending upon the number of groups of signalling markers intercepted, and a second detector coupled to said filter means to receive said output signal and adapted to produce a reset signal for resetting said indicator means, said second detector having a long time constant whereby said reset signal will be delayed by a predetermined time after the interception of the final group of signalling markers.

8. In a system for transmitting information to vehicles moving past a given point on a roadway, a plurality of spaced groups of signalling markers positioned along said roadway adjacent said point, said signalling markers being spaced within a group by a selected interval and having a number of groups according to the information to be transmitted, vehicle-mounted pickup means responsive to the presence of said signalling markers and adapted to produce an electrical output corresponding thereto, a variable-frequency bandpass filter connected to said pickup means to receive said electrical output and adapted to produce an output signal corresponding to the portion of said electrical output within the pass band of the filter, vehicle speed responsive means having an output connected to said bandpass filter and effective to vary the frequency of the pass band thereof in accordance with vehicle speed whereby said pass band will maintain a predetermined correlation with a function of said selected spacing and vehicle speed, a detector coupled to said bandpass filter to receive said output signal and having a time constant greater than the time required by a vehicle to intercept adjacent signalling markers but less than the time required to intercept adjacent groups of signalling markers whereby said detector produces an output pulse for each group, selective indicator means having a drive input connected to said detector to receive said output pulses, said selective indicator means including a plurality of indicator devices and being adapted to energize a particular one of said indicator devices depending upon the number of said output pulses applied to said drive input.

9. In a system for transmitting information to vehicles moving past a given point on a roadway, a plurality of spaced groups of signalling markers extending transversely of said roadway at said point, said signalling markers being longitudinally spaced within a group by a selected interval and having a number of groups according to the information to be transmitted, vehicle-mounted pickup means responsive to the presence of said signalling markers and adapted to produce an electrical output corresponding thereto, a variable-frequency bandpass filter connected to said pickup means to receive said electrical output and adapted to produce an output signal corresponding to the portion of said electrical output within the pass band of the filter, vehicle speed responsive means having an output connected to said bandpass filter and effective to vary the frequency of the pass band thereof in accordance with vehicle speed whereby said pass band will maintain a predetermined correlation with a function of said selected spacing and vehicle speed, a first detector coupled to said bandpass filter to receive said output signal and having a time constant greater than the time required by a vehicle to intercept adjacent signalling markers within a group but less than the time required to intercept adjacent groups of signalling markers whereby said first detector produces an output pulse for each group, selective indicator means having a drive input connected to said first detector to receive said output pulses and having a reset input, said selective indicator means including a plurality of indicator devices and being adapted to energize a particular one of said indicator devices depending upon the number of said output pulses applied to said drive input, a second detector coupled to said bandpass filter to receive said output signal and having a time constant much greater than the time required by a vehicle to intercept adjacent groups of signalling markers whereby said second detector produces a reset pulse at a predetermined time interval after the interception of the final group, and means coupling said second detector to said reset input of said selective indicator means.

References Cited in the file of this patent
UNITED STATES PATENTS

| | | |
|---|---|---|
| 1,803,292 | Adler | Apr. 28, 1931 |
| 2,178,237 | Linder | Oct. 31, 1939 |
| 2,200,739 | Evans | May 14, 1940 |
| 2,243,971 | Maatsch | June 3, 1941 |
| 2,493,755 | Ferrill | Jan. 10, 1950 |
| 2,532,231 | Jarvis | Nov. 28, 1950 |
| 2,552,156 | De France | May 8, 1951 |
| 2,576,424 | Sunstein | Nov. 27, 1951 |
| 2,640,979 | Carter | June 2, 1953 |
| 2,641,688 | Adams | June 9, 1953 |
| 2,692,941 | Sorensen | Oct. 26, 1954 |
| 2,750,583 | McCullough | June 12, 1956 |

OTHER REFERENCES

Publication: Yates, "Motor Touring by Radio," New York Times, Sunday, Feb. 5, 1922.